United States Patent Office 2,966,532
Patented Dec. 27, 1960

2,966,532
ALIPHATIC HYDROCARBON SEPARATION WITH CYANOETHYLATED POLYSACCHARIDES

Earle C. Makin, Jr., El Dorado, Ark., assignor to Monsanto Chemical Company, St. Louis, Mo., a corporation of Delaware No Drawing. Filed June 3, 1959, Ser. No. 817,742

8 Claims. (Cl. 260—677)

This invention relates to a method of treatment of a complex mixture of hydrocarbons. It is an object of this invention to provide an improved process for separating aliphatic hydrocarbons of differing degrees of aliphatic unsaturation contained in mixtures thereof. It is a particular object of this invention to provide an improved process for separating diolefins from monoolefins contained in mixtures thereof. Further objects will become apparent from the description of this invention.

According to this invention, the selective separation of aliphatic hydrocarbons of differing degrees of aliphatic unsaturation contained in mixtures thereof is accomplished by contacting said hydrocarbon mixture with a cyanoethylated polysaccharide. The following examples illustrate this invention:

Example I

Approximately 20 grams of cyanoethylated cotton yarn containing 12.3% nitrogen (2.7 cyanoethyl groups per glucose unit) were tamped into a ½" x 20" glass column to form a firmly packed bed of cyanoethylated cotton yarn. A mixture containing 50% by volume of a butadiene, 25% by volume butenes, and 25% by volume butanes was passed through the bed at a temperature of approximately 25° C. The effluent from the bottom of the column contained significantly less butadiene than did the mixture fed to the column indicating that butadiene had been selectively absorbed by the cyanoethylated cotton yarn.

Example II

The procedure set forth in Example I was repeated utilizing in place of cyanoethylated cotton yarn, cyanoethylated cornstarch containing 2.0 cyanoethyl groups per glucose unit. Butadiene is again selectively absorbed by the cyanoethylated cornstarch.

Example III

The procedure set forth in Example I is repeated utilizing in place of the cyanoethylated cotton yarn, a cotton yarn identical to that which was used in Example I except that it had not been cyanoethylated. No selective absorption of any of the ingredients in the hydrocarbon mixture is noted.

In practicing the novel process of this invention, any cyanoethylated polysaccharide can be used as the process is not limited to the use of the cyanoethylated polysaccharides specifically set forth in the examples. Thus, there may be used all forms of cellulose, starch, cellodextrins, pectic substances and so forth, which have been cyanoethylated. The various types of cellulose suitable, in addition to those mentioned in the examples, include natural fibers such as jute, ramie, linen, and so forth, regenerated cellulose such as viscose, or even partially substituted derivatives containing free hydroxyl groups such as methyl cellulose or ethyl cellulose. The starch used may be of root origin, such as tapioca, or from a grain such as a wheat or corn.

While all cyanoethylated polysaccharides have been found to exhibit some degree of selectivity in the separation of hydrocarbons of a varying degree of aliphatic unsaturation, those cyanoethylated polysaccharides containing from about 1.0 to about 3.0 cyanoethyl groups per glucose unit are particularly useful. At times, if circumstances so dictate, cyanoethylated polysaccharides containing as few as 0.1 cyanoethyl group per glucose unit can be utilized. The cyanoethylated polysaccharides used in the practice of this invention can be prepared by any of the techniques well known to those skilled in the art.

The novel absorption process of this invention can be carried out over a wide temperature range, the temperature not being a critical factor. The process can be carried out at room temperature, it can be carried out at temperatures significantly below room temperature such as 0° C. or it can be carried out as high as 100° C. or 200° C. or even higher as dictated in particular cases.

The hydrocarbon mixture which is to be separated can be brought into contact with the cyanoethylated polysaccharide in either the liquid or gaseous phase. Both are operable. After the cyanoethylated polysaccharide has become spent, that is, it has absorbed the maximum amount of hydrocarbon that it can under the circumstances, the hydrocarbon can be very simply removed by contacting the bed with a solvent for the hydrocarbon. The particular type of solvent used is not a critical factor as long as the cyanoethylated polysaccharide is insoluble in the particular solvent.

The novel extraction process of this invention is used to separate aliphatic hydrocarbons having a varying degree of aliphatic unsaturation contained in mixtures thereof. Insofar as this invention is concerned, the degree of aliphatic unsaturation of an aliphatic hydrocarbon is determined solely by the type, regardless of the substituent groups, of the aliphatic unsaturation in the molecule. Thus, butene, propylene, pentene, methylcyclopentene, etc., have the same degree of aliphatic unsaturation for the purpose of this invention. Propylene, methyl acetylene, butadiene, etc., have differing degrees of aliphatic unsaturation for the purposes of this invention. The process of this invention is particularly well suited for the separation of alkanes from monoolefins, monoolefins from diolefins, alkanes from acetylenes, alkanes from diacetylenes, diolefins from acetylenes, and alkanes from cyclic olefins.

What is claimed is:

1. A process for separating aliphatic hydrocarbons of differing degrees of aliphatic unsaturation contained in mixtures thereof which comprises contacting said mixture with a cyanoethylated polysaccharide.

2. A process as described in claim 1 wherein the cyanoethylated polysaccharide contains from about 1.0 to about 3.0 cyanoethyl groups per glucose unit.

3. A process as described in claim 2 wherein the cyanoethylated polysaccharide is cyanoethylated cellulose.

4. A process as described in claim 2 wherein the cyanoethylated polysaccharide is cyanoethylated starch.

5. A process for separating diolefins from monoolefins contained in mixtures thereof which comprises contacting said mixture with a cyanoethylated polysaccharide.

6. A process as described in claim 5 wherein the cyanoethylated polysaccharide contains from about 1.0 to about 3.0 cyanoethyl groups per glucoes unit.

7. A process as described in claim 6 wherein the cyanoethylated polysaccharide is cyanoethylated cellulose.

8. A process as described in claim 6 wherein the cyanoethylated polysaccharide is cyanoethylated starch.

References Cited in the file of this patent

UNITED STATES PATENTS

| | | |
|---|---|---|
| 2,594,044 | Loder | Apr. 22, 1952 |
| 2,626,959 | Chenicek | Jan. 27, 1953 |
| 2,736,756 | Elgin | Feb. 28, 1956 |

FOREIGN PATENTS

| | | |
|---|---|---|
| 371,394 | Great Britain | Apr. 13, 1952 |